June 24, 1969

L. H. MICHENER 3,451,448

AUTOMATIC TREE PRUNER

Filed Aug. 2, 1966

LYNN H. MICHENER
INVENTOR.

BY James L. German
ATT'Y

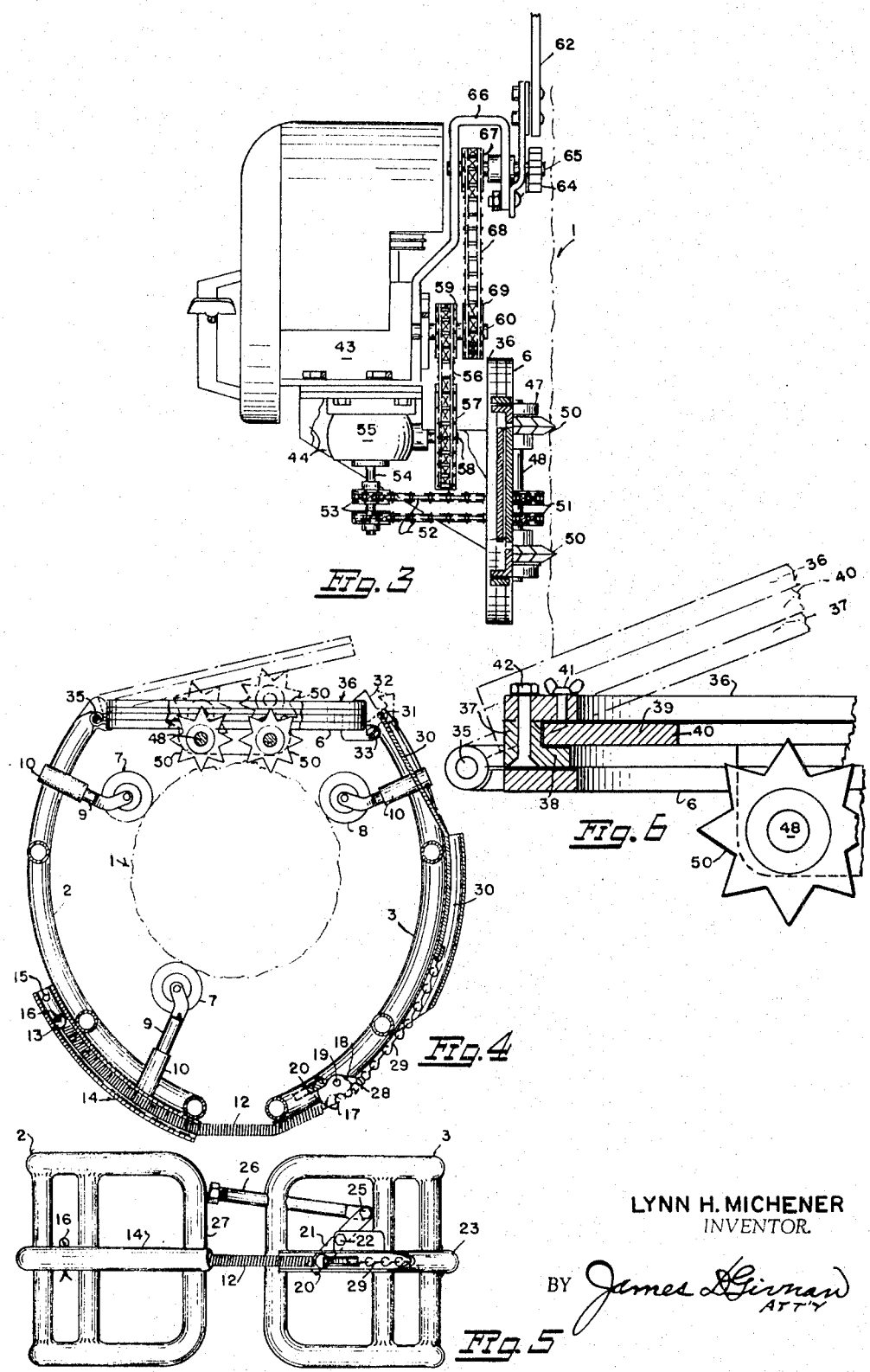

3,451,448
AUTOMATIC TREE PRUNER
Lynn H. Michener, 842 3rd Ave.,
Vernonia, Oreg. 97064
Filed Aug. 2, 1966, Ser. No. 569,704
Int. Cl. B27c 9/00; B27m 3/00
U.S. Cl. 144—2                                  3 Claims

ABSTRACT OF THE DISCLOSURE

Tree pruning apparatus automatically operable to ascend a tree trunk in a spiralling path of travel for cutting off branches up to a predetermined height, then descending to the base of the tree.

---

This invention relates to improvements in tree pruning apparatus, as described above, whose entire operation is automatically and mechanically performed without manual guidance or control.

The objects of the invention are:

To provide apparatus of the character described which is automatically expandable and contractable to adjust for various diameters of a tree trunk.

To provide apparatus as above described wherein automatic means are provided for causing descent of the apparatus when it reaches its limit of upward travel.

To provide tree-pruning apparatus contemplated by this invention which is of simple, efficient, durable, inexpensive construction, positive and fool-proof in operation and readily adaptable to tree trunks of a wide range of heights and diameters.

The foregoing and other objects and advantages which will become subsequently apparent reside in the details of construction and operation as more fully hereinafter described and claimed, reference being had to the accompanying drawings forming a part hereof and in which:

FIGURE 3 is a side elevational view of the driving connections between the engine, the tree climbing elements and the power saw.

FIGURE 4 is a view similar to FIGURE 2 showing means serving a dual purpose of rendering the apparatus self-adjusting to the gradually reducing diameter of a tree in its upward travel therearound and releasing the climbing mechanism when the predetermined limit of such travel is reached.

FIGURE 5 is a front elevational view of FIGURE 4 with parts removed for clearness of illustration.

FIGURE 6 is an enlarged, fragmentary, sectional, detail, plan view through a motor mount and tree engaging star wheels.

Figure 2:
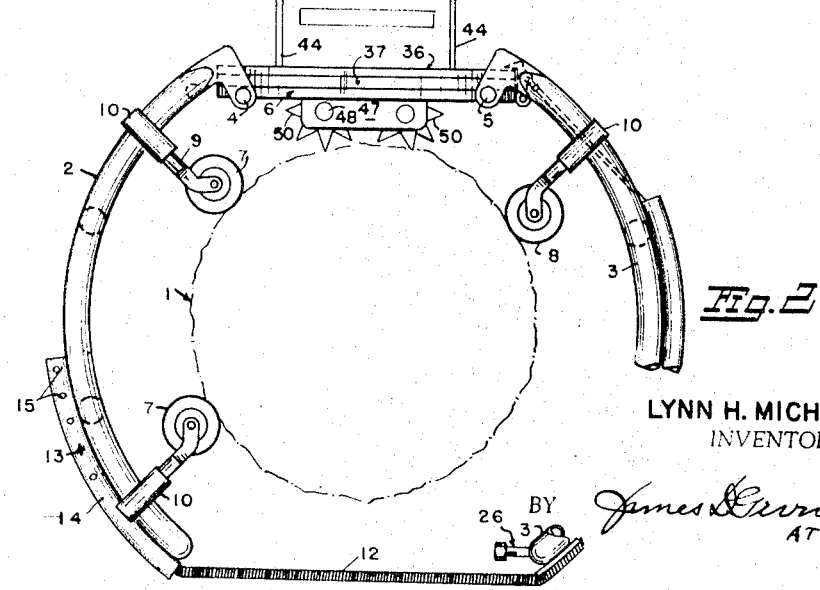
FIGURE 2 is a top plan view of FIGURE 1 with the engine and power saw removed and fragments broken away.

With continuing reference to the drawings, wherein like references of character designate like parts and particularly FIGURES 2 and 4 thereof, reference numeral 1 indicates in broken lines a tree trunk which naturally reduces in diameter from its base portion as in FIGURE 2 to approximately that shown in FIGURE 4.

A main frame comprising two horizontally disposed arcuate arms 2 and 3 preferably made of hollow steel tubing are pivotally connected at their inner ends as at 4 and 5 respectively to a vertically disposed main ring member 6. Each arm is provided with substantially diametrically opposed tree-engaging wheeled casters 7 and 8 pivotally mounted by their shafts 9 in sockets 10 secured as by welding or the like to the arms 2 and 3.

As best illustrated in FIGURE 4, the arms 2–3 are at all times under a centripetal compression load by a tension spring 12 attached at one of its ends as at 13 to a tubular member 14 welded or otherwise secured to the outer end of the arm 2. This end of the spring is adjustably attached to the tubular member 14 by means of spaced apart apertures 15 therein for the reception of a cotter pin or the like as at 16. The spring extends across the two free ends of the arms 2–3 and its opposite end is permanently attached as at 17 to one side of one end of a trigger in the form of a plate 18 pivotally attached as at 19 to arm 3. The opposite side of this end of the trigger 18 is arranged in the path of movement of the lower end 20 of a trigger arm 21 pivotally attached as at 22 (FIG. 5) to an intermediate frame member 23 of arm 3. The opposite end of trigger arm 21 is pivotally attached as at 25 to one end of an actuating shaft or plunger 26 whose opposite or free end is in the path of movement of the free end 27 of arm 2.

The opposite end of trigger plate 18 is connected as at 28 to one end of a pull chain 29 attached at its opposite end to a cable 30 whose opposite end is connected as at 31 to a detent 32 pivotally attached as at 33 to the vertically disposed ring member 6. From the foregoing it will be readily apparent that throughout the tree climbing operation the wheeled casters 7 will be held in rolling contact with the tree trunk throughout the gradually reducing diameter thereof.

Hingedly attached as at 35 to ring 6 is an engine mount including a matching ring 36 spaced from ring 6 by an annulus 37 circumferentially flanged on its interior as at 38 to cooperate with ring 6 in rotatably supporting an engine supporting plate 39 having an enlarged opening 40 therethrough and settable in any rotatably adjusted position by thumb screws 41 threadedly extending through ring 36. The annulus 37 is secured to ring 36 by bolts 42.

Figure 1:
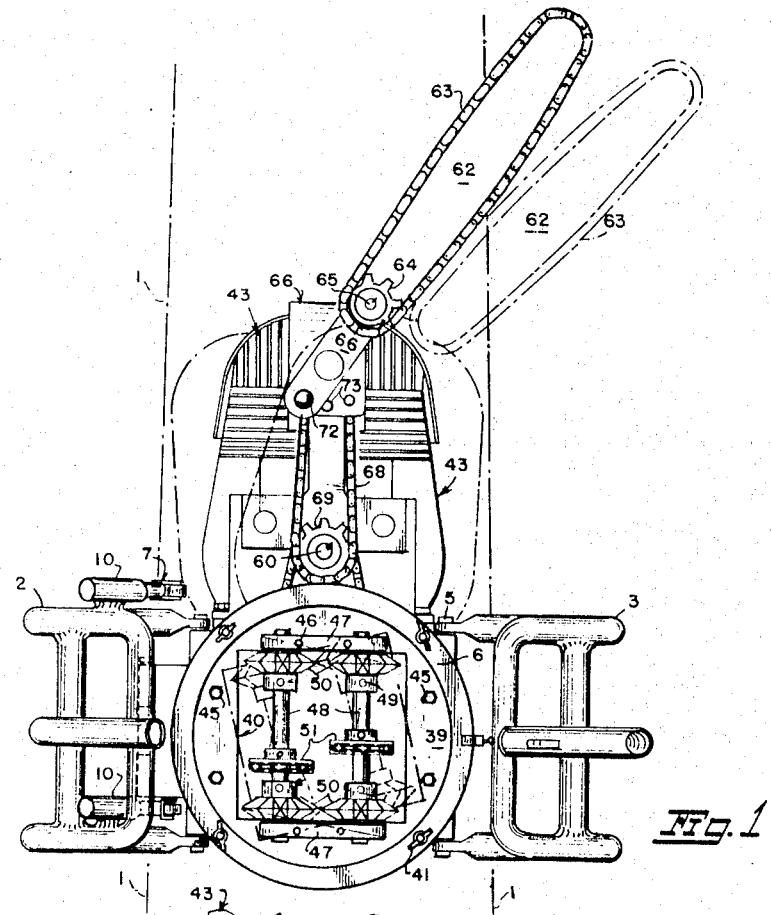
FIGURE 1 is an elevational view of tree trimming apparatus made in accordance with my invention.

As best illustrated in FIGURES 1 and 3, an internal combustion engine 43 is secured by brackets 44 and bolts 45 to the engine supporting plate 39 and therefore rotatably adjustable therewith.

Mounted as at 46 (FIGURE 1) to the plate 39 above and below the opening 40 are bearing blocks 47 (also FIG. 3) through which are journalled two parallel shafts 48 to which are secured as at 49 two pairs of tree trunk engaging star wheels 50.

These star wheels 50 are rotatably driven by means of sprocket wheels 51 (FIG. 3) secured to the shafts 48 and sprocket chains 52 entrained thereover and over two driving sprocket wheels 53 (FIG. 3) secured to the power output shaft 54 of a power transmission means 55 driven by the engine 43 through the medium of a sprocket chain 56 entrained over a driven sprocket wheel 57 secured to the power input shaft 58 of the transmission means and over a driving sprocket wheel 59 secured to the power output shaft 60 of the engine 43.

A power saw includes a saw bar 62 (FIGS. 1 and 3) and a saw chain 63 entrained therearound driven by a sprocket wheel 64 secured to the outer end of a stub shaft 65 journalled through a bracket 66 and provided with a sprocket wheel 67 and a sprocket chain 68 entrained thereover and over a second driving sprocket wheel 69 secured to the engine shaft 60.

From the foregoing it will be apparent that the engine 43 may be tilted to the right or left as indicated by broken lines in FIGURE 1 by rotation of its supporting plate 39 relative to the supporting rings 6 and 36 and locked in any adjusted position by tightening the thumb screws 41. In addition thereto the chain saw 62 may be independently adjusted diagonally relative to the axis of the tree trunk 1 by selective engagement of the anchor bolt 72 with apertures 73 in the bracket 66.

OPERATION

Assuming that the apparatus is in a starting position (FIGS. 1 and 2) for the tree climbing and pruning operation it will be seen that the wheeled casters 7 and 8 are held in circumferential rolling contact with the tree trunk 1 and the star wheels 50 in penetrating rolling engagement therewith by the compressive forces applied to the arms 2 and 3 by the tension spring 12. Tilting the engine 43 to the left as aforesaid will diagonally position the star wheels 50, also movable with the engine in the same direction, for propelling the entire assembly in a power driven encircling upward spiral path around the tree trunk along with the chain saw in its selective operative position when the engine is put in operation.

The power-driven encircling spiral path of travel by the star wheels 50 in the broken line position shown in FIGURE 1 is in a clockwise direction as viewed in FIGURE 2 which presents the chain saw 62 to the tree branches to be cut in any selective angular relationship as indicated by full and broken lines in FIGURE 1.

The limit of such upward travel is predetermined by the extended or retracted setting of the bolt 26A relative to the free end of the plunger 26.

In FIGURE 5 it will be seen that the free end of arm 2 has made initial contact with the plunger 26 in accordance with the setting of bolt 26A and that further pressure of arm 2 against the plunger in the final approach to the travel limit will force the plunger to the right and the bottom end of trigger arm 21 to the left and thereby disengage its bottom end 20 from the trigger plate 18. Rotation of this plate by the pull of spring 12 will by the resultant pull on the chain 29 and cable 30 rock the detent 32 about its pivot point 33 and thus free the engine mount 40 and its related parts 36–37 along with the star wheels 50 to swing away from the tree trunk 1. The entire apparatus will then be free to gravitate downwardly along the tree trunk as the wheeled casters 7 and 8 are automatically turned downwardly into longitudinal rolling contact with the tree trunk. After disengagement of the detent 32, as above pointed out, the arms 2 and 3 will continue to hold the caster wheels in rolling contact with the tree trunk by the compressive action of the spring 12.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

1. A tree climbing and limb sawing device comprising in combination an engine mount including a plate,
   an engine mounted to said plate,
   a power saw carried by the engine and haivng a driving connection therewith,
   means rotatably and lockably mounting said plate within cooperating ring members,
   arms hingedly attached to said engine mount and movable in a horizontal plane relative to each other and to a tree trunk embraced by said arms,
   means titltingly and lockably mounting the power saw relative to said engine,
   star wheels rotatably carried by said plate and adjustable therewith into driving connection with the tree trunk and having a driving connection with the engine,
   idler wheels carried by said arms,
   means tilting said star wheels off a vertical plane in engagement with a tree trunk to impart power driven travel to the device in an upwardly spiralling path about the tree trunk during engine operation, and
   means normally maintaining said wheels in rolling contact with the tree trunk.

2. A tree climbing and limb sawing device as claimed in claim 1 wherein said engine mount is characterized by a fixed ring,
   each of said arms being substantially semicircular,
   means hingedly attaching said arms to said fixed ring,
   said engine mount further characterized by a pair of ring members and a plate rotatably mounted therebetween,
   said ring members and plate hingedly attached to said fixed ring and swingable as a unit relative thereto,
   a detent carried by one of said arms normally engaged with and holding said unitary ring members and plate in coplanar abutment with said fixed ring,
   elastic means interconnecting said arms and centripetally holding the same and said engine mount in operative relation to a tree trunk,
   a trigger-plate interconnected within said elastic means and mounted for pivotal movement relative to one of said arms,
   a horizontally disposed abutment having one of its ends slidably extending from said one of said arms and arranged in the path of movement of the adjacent end of the other of said arms,
   means associated with the opposite end of said abutment and normally arranged in the path of said pivotal movement of said trigger plate for holding the same inoperative,
   whereby upon centripetal contraction of said arms at a predetermined limit of upward travel of the device and resultant movement of said abutment by said other of said arms and resultant pull on said elastic means will disengage said detent from said engine mount to free the mount and said drive dogs for free movement in horizontal planes away from the tree trunk.

3. A tree climbing and limb sawing device as claimed in claim 1 including wheeled casters carried by said arms and adapted for rolling contact with a tree trunk.

References Cited
UNITED STATES PATENTS 2,612,724 10/1952 Llewellyn.
3,315,714 4/1967 Meier.
3,364,961 1/1968 Otterbach et al. _____ 144—2

ANDREW R. JUHASZ, *Primary Examiner.*

FRANK T. YOST, *Assistant Examiner.*